United States Patent [19]

Yamada et al.

[11] Patent Number: 5,520,455
[45] Date of Patent: May 28, 1996

[54] BATCH TYPE KNEADER HAVING SPECIFIED PARAMETERS AND CHAMFERED LANDS

[75] Inventors: Norifumi Yamada; Tatsuya Tanaka, both of Takasago; Norihiko Nakamoto, Kobe; Sumio Hayashida; Katsunobu Hagiwara, both of Takasago, all of Japan

[73] Assignee: Kabushiki Kaisha Kobeseikosho, Kobe, Japan

[21] Appl. No.: 338,521

[22] PCT Filed: Apr. 1, 1994

[86] PCT No.: PCT/JP94/00546

§ 371 Date: Jan. 6, 1995

§ 102(e) Date: Jan. 6, 1995

[87] PCT Pub. No.: WO94/22649

PCT Pub. Date: Oct. 13, 1994

[30] Foreign Application Priority Data

Apr. 5, 1993 [JP] Japan .................. 5-078243
Apr. 5, 1993 [JP] Japan .................. 5-078244
Apr. 8, 1993 [JP] Japan .................. 5-082124

[51] Int. Cl.⁶ .................................. B29B 7/20
[52] U.S. Cl. ............... 366/97; 366/300; 366/301
[58] Field of Search ............... 366/76, 79, 83–85, 366/90, 297–301, 318, 324, 96–99; 425/204, 208, 209

[56] References Cited

U.S. PATENT DOCUMENTS 4,184,773  1/1980  Ellwood ................. 366/300 X
4,234,259  11/1980 Wiedmann et al. .......... 366/300 X
4,284,358  8/1981  Sato et al. ............... 366/297 X
4,456,381  6/1984  Inoue et al. ............. 366/300 X
4,718,771  1/1988  Asai et al. .............. 366/300 X
4,859,074  8/1989  Asai et al. .............. 366/300 X

FOREIGN PATENT DOCUMENTS 0213882    3/1987   European Pat. Off. .
0346680    12/1989  European Pat. Off. .
137905     10/1979  Germany ................... 366/85
59-31369   8/1984   Japan .
62-44409   2/1987   Japan .
63-1093    1/1988   Japan .
63-47106   2/1988   Japan .
63-136908  9/1988   Japan .
63-306006  12/1988  Japan .
232812     2/1990   Japan .
2297405    12/1990  Japan .
2028153    3/1980   United Kingdom .

Primary Examiner—Charles E. Cooley
Attorney, Agent, or Firm—Oblon, Spivak, McClelland, Maier & Neustadt

[57] ABSTRACT

A batch type kneader (1) is provided with a chamber (3) having a material supply port (5) which can be closed, a pair of rotors (4A, 4B) which are disposed in the chamber (3) so as to be rotatable in opposite directions, and wings (10) provided over the outer circumferential surfaces (10A) of the rotors (4A, 4B) in such a way that they (10) mesh with each other. In this kneader (1), a ratio S/D of a clearance S between the outer circumferential surfaces (10A) of the wings (10) of the rotors (4A, 4B) and an interior wall surface of the chamber (3) to an inner diameter D of the chamber (3) is set in the range of 0.01–0.02. The lands on the wings of the rotors have chamfers.

9 Claims, 13 Drawing Sheets

BATCH TYPE KNEADER HAVING SPECIFIED PARAMETERS AND CHAMFERED LANDS

FIELD OF THE INVENTION

This invention relates to a meshing blade type batch kneader used in mixing polymeric materials, e.g., rubber materials.

RELATED STATEMENT

A batch type kneader is generally used in a so-called master batch process for making the physical properties of different types of materials even, in which compounding agents such as carbon, and oil are mixed with polymeric materials which are raw materials of tire products and general industrial products.

Tangential type kneaders and meshing type kneaders, examples of which are shown in FIGS. 19 through 22, are known as this type of batch kneader.

A kneader shown in FIG. 19 will be hereinafter referred to as a first conventional example. This first conventional example is disclosed in Unexamined Japanese Utility Model Publication No. SHO 63-136908. In this example, a kneading chamber 22 is formed in a closed interior enclosed by a casing 21 and an end frame, not shown. A pair of wing rotors 23 are disposed in the chamber 22 parallel to each other in such a way as to rotate in opposite directions. A communicating path 24 is formed between the rotors 23 so as to extend over almost the entire length of the chamber 22. A hopper 25 for feeding materials is formed at an upper part of the chamber 22 along the center line of the chamber 22 that corresponds to the communicating path 24. A ram 26 for forcing materials is removably fitted to an upper part of the hopper 25, and an exhaust port 27 for mixed materials is formed at a lower part of the chamber 22. A door 28 is removably fitted to the exhaust port 27.

A main wing and an aileron, neither shown, are attached to each of the rotors 23, and the aileron is arranged in such a manner as to be synchronized with the main wing of the respective rotor at the center of the rotor.

A kneader shown in FIG. 20 (a second conventional example) is disclosed in Unexamined Japanese Patent Publication No. SHO 63-306006. The main construction of this kneader is the same as that of the first example shown in FIG. 19, but a plurality of pins 29 are provided around barrel wings of both rotors 28. This increases the capacity for taking materials into the chamber 22.

A kneader (a third conventional example) shown in FIGS. 21 and 22 is disclosed in Examined Japanese Patent Publication No. SHO 63-1093. The main construction of this kneader is the same as that of the first conventional example shown in FIG. 19. A ratio of the length L of the rotor 23 to an inner diameter D of the chamber is set to 1.25±0.1; a ratio l/L of the length l of a main wing 30 to the length L of the rotor is set to 0.5–0.7; a ratio a/L of a length a of a part of the rotor without the wing to the length L of the rotor is set to 0.15–0.35; an angle $\theta$ of torsion is set to 55°±5°; and a ratio S/D of a tip clearance S to the inner diameter D of the chamber is set to 0.0275±0.0075. The object of this kneader is to make the distribution of temperatures even so as to speed up the transfer of heat by increasing the speed of movement of the materials.

Here, it is said that the meshing type batch kneader is inferior in productivity to the tangential type kneader. Moreover, the meshing type batch kneader is designed on the basis of the ratio S/D of the tip clearance S to the inner diameter D of the chamber, and hence, materials shearing force between the rotors 23 is limited by the ratio S/D.

The previously mentioned prior art is inferior to the tangential type kneader in terms of the capacity for biting materials. This is attributable to a small space between the rotors. When the time required for biting materials, in other words, a ram sheet time, is increased, the time for mixing all introduced materials is reduced, which in turn results in increased variations for each batch. To eliminate this problem, it is necessary to fractionize materials into small pieces at higher speed between the rotors and the chamber, or between the rotors.

In the first conventional example, the rotors have only a few teeth which rotate with clearance, and hence the capacity for fractionization between the rotors is poor. To provide the same energy, the first conventional example requires about 15% more time compared with the tangential type kneader.

In the second conventional example, the pins 29 are attached to the rotors, and hence, the capability of biting materials can be increased to a certain extent. However, the pins 29 hinder the axial flow of material and the flow of material to the corresponding rotor during the processes for fractionizing the material into small pieces and dispersing carbon over the material after the material has been bitten, as a result of which a residual part is formed. For this reason, there is a substantial possibility of uneven mixing of material caused by the generation of localized interior heat.

In addition, in the third conventional example, since the torsional angle $\theta$ of the wings is large, force for causing material to flow in the axial direction becomes larger, which reduces the flow of material between the right and left portions of the chamber. It is impossible to reduce the ratio S/D of the tip clearance S to the inner diameter D of the chamber, and hence, the tip clearance S becomes larger. This makes it difficult to expect appropriate shearing force between the rotor and the chamber, and also makes it impossible to reduce a clearance between the wings and the corresponding rotor because it is necessary to ensure the capability of biting the material. Thus, shearing force in either of the clearances is small, and the capability of fractionizing material into small pieces is poor.

In the prior techniques, in order to realize mixing at low temperatures, it was designed so as to enlarge the width of the wings and a cooling area of the rotor and to increase the ratio S/D of the tip clearance S to the inner diameter D of the chamber. Thereby, the generation of shearing force is reduced, and power consumption of the kneader is suppressed. Although it is possible to realize low temperature mixing, there remains a difficulty of dispersibility. An increase in land width of the wings of the rotor hinders the passage of material between the wings of the rotor and an interior wall surface of the chamber (a portion which is subject to shearing force). Particularly, when rubber is mixed, most of the rubber is supplied to the inside of the sealed chamber in the form of a bale, and hence, effective shearing force does not act on the rubber in the early stage of mixing, thereby deteriorating the material biting property.

DISCLOSURE OF THE INVENTION

The present invention is made in view of the above descriptions, and a first object of the present invention is to provide a batch type kneader that has improved mixing performance by affording material appropriate shearing force between wings of rotors and a chamber and speeding up the fractionization of material and, also, makes it possible to prevent uneven mixing of material by effecting appropriate flow of the material in the axial direction and between the right and left portions of a chamber.

A second object of the present invention is to provide a batch type kneader which can realize the fractionization of material and sufficient mixing action by affording the material optimum shearing force between a pair of rotors and, also, improve a biting capability when material is introduced.

A third object of the present invention is to provide a batch kneader rotor that makes it possible to improve by virtue of the property of biting material at the initial stage of mixing and effective shearing action with respect to the material.

To achieve the first object, the present invention provides a batch type kneader comprising a chamber having a material supply port which can be sealed, a pair of rotors which are disposed in the chamber so as to be rotatable in opposite directions, and wings attached to the outer circumferential surfaces of both rotors so as to mesh with each other, wherein a ratio S/D of a clearance S between the outer circumferential surface of the wing of the rotor and an interior wall surface of the chamber to an inner diameter D of the chamber is set in the range of 0.01–0.02.

This numerical limitation is intended to afford material to be mixed an appropriate shearing force and to obtain a mixing capability. When the ratio becomes smaller than the minimum numerical value, an excessive shearing force acts on the material, which in turn increases the required electric power and the temperature. Contrary to this, when the ratio becomes higher than the maximum numerical value, the shearing force becomes less likely to act on the material, and hence, it takes a longer time to mix the material.

According to the present invention, an appropriate shearing force acts on material between the interior wall surface of the chamber and land surfaces of the rotor wings, and hence the fractionization of material is speeded up, and the capability of biting the material is increased. Therefore, it becomes possible to mix the material in a short time without the abnormal generation of heat, and to improve mixing performance.

In this invention, a torsional angle θ with respect to the wings of the rotors should preferably be set to less than 50°.

Such a limitation of the torsional angle makes forces in the axial direction and the circumferential direction, both acting on the material, appropriate. If the torsional angle becomes smaller than this value, the flow of material in the axial direction will become poor, and hence it will become impossible to maintain the evenness of material to be mixed. Contrary to this, if the torsional angle becomes larger than this value, the flow of material in the circumferential direction will become poor, and hence a shearing force will not act on the material.

In this way, the flow of material both in the axial direction and in the direction of the right and left portions of the chamber becomes even without being biased to one side, by setting the torsional angle of the wings of the rotors to less than 50°, thereby resulting in even mixing.

Moreover, in this invention, the wings of the rotors are provided with center wings disposed at the axial center of the rotor. It is desirable that a ratio l/L of an axial length l of the center wing to an axial length L in the chamber be set to more than 0.6, and also that a ratio a/L of an axial length a between the end of the center wing and the end of the rotor to the axial length L in the chamber be set to not greater than 0.2.

Such a numerical limitation contributes to the appropriate flow of material in the axial direction.

In other words, if the ratio l/L becomes smaller than the minimum numerical value, there will not be much opportunity to impart a shearing force to the material, thereby resulting in poor efficiency. Contrary to this, if the ratio a/L becomes larger than the maximum numerical value, the volume of the rotors will be increased, thereby resulting in a reduced effective volume of the chamber.

If the ratios are set within the ranges of the values defined by the present invention, the flow of material in the chamber will be smoothly bifurcated at the ends of the rotors in the axial direction thereof. Namely, it will be possible to ensure effective mixing action by means of the center wings as well as to bifurcate the flow of material at cavities formed at the ends of the center wings in the axial direction thereof in an optimum way. Thereby, it becomes possible to eliminate uneven mixing and to achieve an improved material push-in capability and improved mixing performance.

In this invention, the wings of the rotors are provided with the center wings positioned at the axial center of the rotor, and end wings positioned at both axial ends of the rotor. It is desirable that one of the end wings positioned at one end should have the same torsional angle as that of the center wing, and also that the other end wing positioned at the other end should have a torsional angle which is opposite to that of the center wing.

It is also desirable that the wings of the rotors be made up of one center wing positioned at the axial center of the rotor, one end wing positioned at one axial end of the rotor, and two end wings positioned at the opposite end.

To attain the second object of the present invention, according to this invention, the wings of the rotors are arranged in such a way that opposite acting surfaces of the wings, when they mesh with each other, are held by a predetermined distance apart from each other along the line between the axial centers of both rotors.

According to this invention, a constant optimum shearing force acts on material even in between both rotors, and hence the performance of mixing material will be improved. When the material, which is located at a lower part of a material supply port of the chamber and is not yet drawn into the chamber, is sequentially drawn and appropriately fractionized into small pieces by means of the meshing portions of both rotors, a compounding agent, other than the main body of material, more rapidly adheres to the surface of the fractionized main body of the material, which speeds up mixing. This results in a substantially improved capability of biting the material, and a shorter material drawing time.

Therefore, the time required for simultaneously mixing the total amount of introduced material within the chamber becomes longer than the time required for one mixing process. In other words, the time during which material is drawn into the chamber becomes shorter, and a mixing state for each bath (one process) becomes even, and therefore mixing performance is improved.

In this invention, a ratio d/A of a distance d, between the outer circumferential surface of the wing of one rotor and the outer circumferential surface of a barrel of the other rotor to a distance A between both rotors is set in the range of 0.01–0.04.

This numeral limitation is intended to provide an appropriate space between the rotors so as to effect mixing between the rotors and the biting of the material.

If the ratio d/A becomes smaller than the minimum value, the clearance will become narrow, and therefore the biting of the material will become poor. However, if the ratio d/A becomes larger than the maximum value, the clearance will become larger, and hence it will become difficult for a shearing force developing between the rotors to act on the material.

According to the construction of this invention, it becomes possible to set an optimum shearing force as well as to change a ratio of an area, on which a shearing force occurring between the end of the wing and a wall surface of the chamber acts, to an area, on which a shearing force occurring between the rotors acts, in an optimum way by optionally selecting a ratio of a distance between opposite surfaces to a distance between the rotors within the range of 0.01–0.04 in such a fashion that a value of required physical property (for example, Mooney value) is obtained in accordance with the type of material to be mixed.

To attain a third object, the wing of each rotor has a chamfered angled portion for biting the material where a rotor front surface, which is a front surface in the direction of rotation of the rotor, meets a land surface.

It is desirable that the shape of this biting angled portion be a two-stage chamfered shape in which the front side and the land side are connected with each other by two straight lines.

As a result of such a construction, the material biting property is improved, and it becomes easy for the material supplied in the form of a bale in the early stage of mixing to pass through a space between the angled portion and the interior wall surface of the chamber, thereby resulting in an improved mixing ratio, efficiently smashing and fractionizing material and a reduced mixing time.

The Mooney viscosity and the degree of dispersion of carbon are also improved. A larger amount of material passes through the angled portion of the wings of the rotor, and hence temperature and viscosity for each batch process, as well as the degree of dispersion of carbon, become smaller, which makes a mixed state of the material even.

As the amount of material that passes through the space between the land surface of the rotor wing and the interior wall surface of the chamber becomes larger, a biting property becomes better, and a force for thrusting the ram occurring when the material is pressed from the inside of the chamber to the supply port is reduced as well. Hence, the force required for pressing down the ram becomes smaller, and the influence of this force on the strength of the rotor is small, thereby rendering design conditions improved.

BRIEF DESCRIPTION OF THE DRAWINGS

In the accompanying drawings:

FIGS. 14A and 14B are enlarged views of a rotor of the kneader shown in FIG. 13, wherein FIG. 14A shows the rotor when the length of a chamfered angled portion on each stage for biting material is short, and FIG. 14B shows the rotor when the length of the chamfered angled portion on each stage for biting material is long;

DESCRIPTION OF THE PREFERRED EMBODIMENTS

With reference to the accompanying drawings, preferred embodiments of the present invention will be described hereinbelow.

Figure 1:
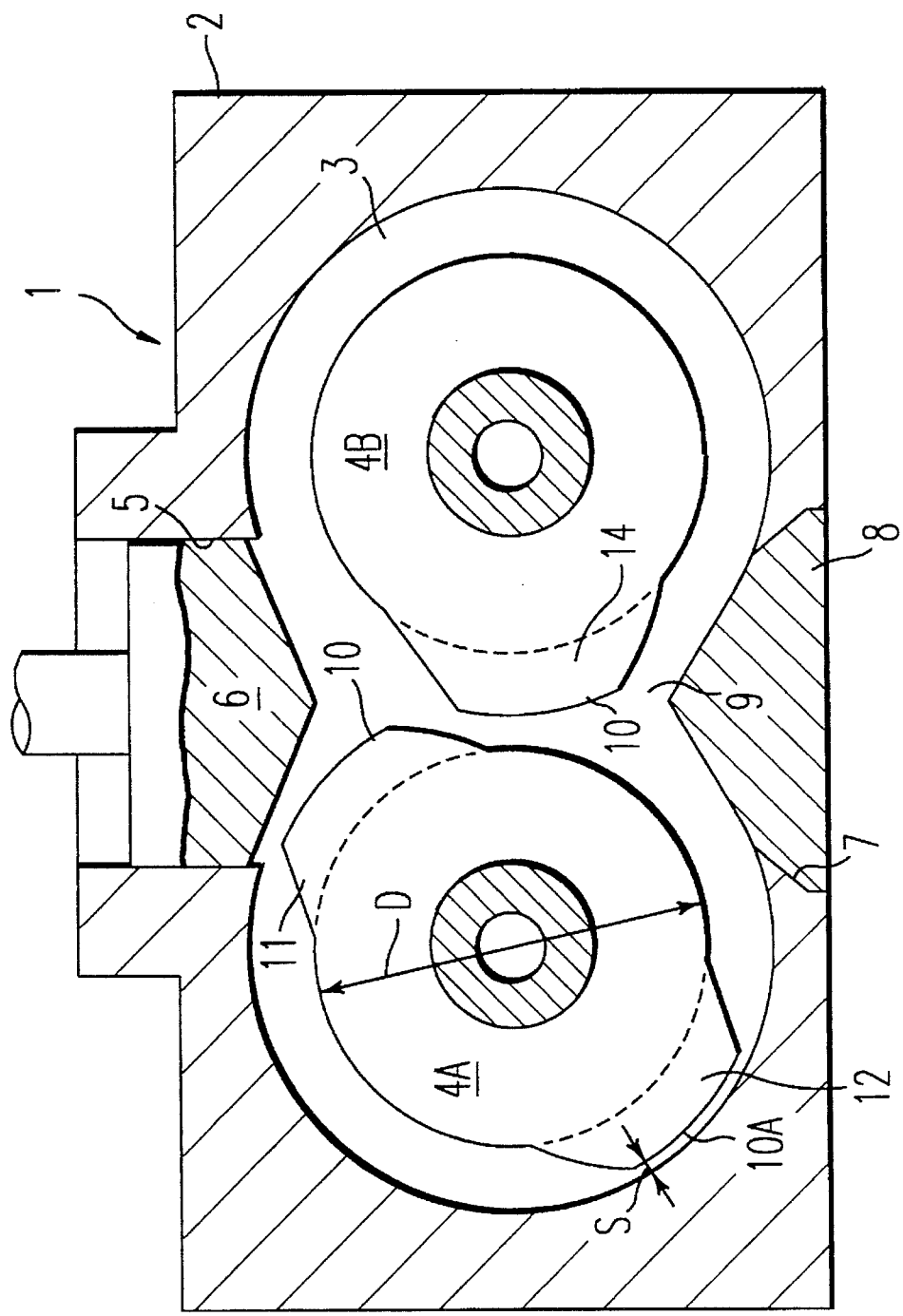
FIG. 1 is a longitudinal cross-sectional view showing a batch type kneader in a first embodiment according to the present invention.
Figure 2:
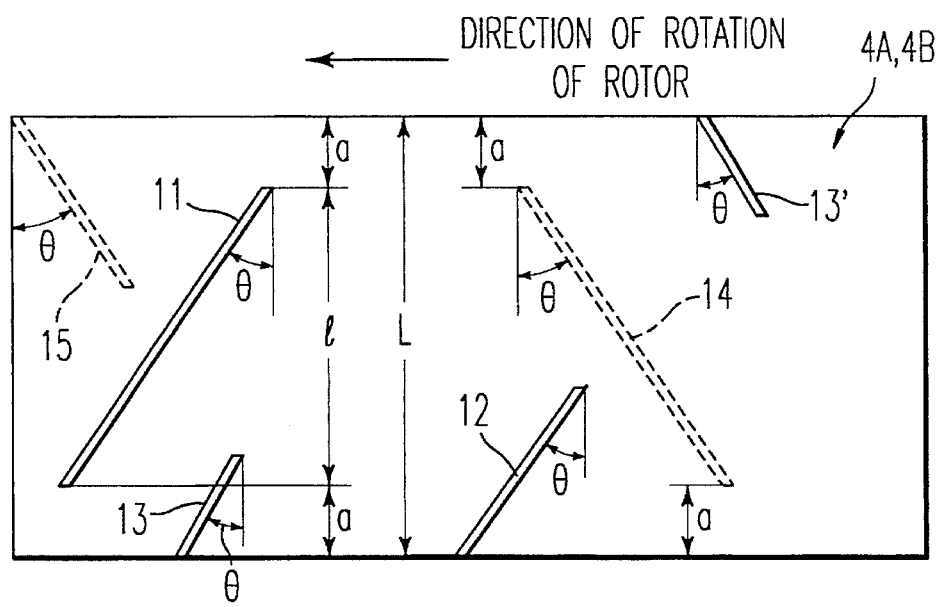
FIG. 2 is an exploded plan view of a rotor in the first embodiment shown in FIG. 1.

FIGS. 1 and 2 show a first embodiment of a batch type kneader according to the present invention. A kneader 1 is provided with a mixing chamber 3 which is closed by means of a casing 2 and an end frame (not shown), a pair of winged rotors 4A and 4B disposed parallel to each other within the chamber 3 so as to be rotatable in opposite directions, a material push-in ram 6 which is removably fitted to a material supply port 5 formed in the upper center of the chamber 3, and an opening and closing door 8 which is removably fitted to a mixed substance exhaust port 7 formed in the lower center of the chamber 3.

The casing 2 is provided with a communicating path 9 in such a way that both rotors 4A and 4B are communicated with each other over almost the entire length of the chamber 3. A constant clearance S (a tip clearance) is formed between an interior wall surface of the chamber 3 and an outer circumferential surface, i.e., a land surface 10A of a wing 10 (which is also referred to as tip). A ratio S/D of this clearance S to an inner diameter D of the chamber 3 is set in the range of 0.01–0.02.

As shown in FIG. 2, the wings of one rotor 4A consist of a center wing 11 disposed at the axial center of the rotor 4A, and first to third end wings 12, 13 and 13' disposed on both axial ends of the rotor 4A. The first end wing 12 and the second end wing 13 of the end wings 12, 13 and 13' that are disposed at one end of the rotor have the same direction of torsion as the center wing 11, but the third end wing 13' disposed at the other end has a direction of torsion which is opposite to that of the center wing 11. Torsional angles $\theta$ with respect to the axes of the wings 11, 12, 13 and 13' are equal to each other.

The length of the first end wing 12 in the axial direction is set to less than half the length of the center wing 11 in the axial direction. The second end wing 13 is set so as to be shorter than the first end wing 12, and the length of the third end wing 13' on the opposite side is set so as to be the same as that of the second end wing 13.

The wings of the other rotor 4B consist of a center wing 14 and an end wing 15 as illustrated by a dot line in FIG. 2. Torsional angles $\theta$ of the center wing 14 and the end wing 15 are equal to each other, and the direction of torsion of these wings is opposite to that of the center wing 11. Moreover, both center wings 11 and 14 mesh with each other.

Torsional angles $\theta$ with respect to the wings 11, 12, 13, 13', 14 and 15 are equal to each other and are set to less than 50°.

The lengths l of the center wings 11 and 14 of both rotors 4A and 4B in the axial direction are equal to each other, and a ratio l/L of the length l to the length L of both the rotors 4A and 4B is set to 0.6 or less. A ratio a/L of the lengths a (that is, the distances from the ends of the rotor to the wing) of portions without wings at both ends of the center wings 11 and 14 in the axial direction to the length L of the rotors 4A and 4B is set to not greater than 0.2.

The lengths of the end wings 12 and 15 of the rotors 4A and 4B are equal to each other, and are set to half the length L of the rotors 4A and 4B.

Reasons for setting the ratio S/D of the tip clearance S to the chamber inner diameter D in the range of 0.01 to 0.02 are as follows. Specifically, if the ratio S/D is set to less than 0.01, a material shearing force will be obtained, but the generation of heat will become excessive. However, if the ratio S/D is set to more than 0.02, the tip clearance S will become larger, and hence the shearing force will not be obtained. Moreover, the reason for setting the torsional angle $\theta$ of each wing of the rotors 4A and 4B to less than 50° is why a force for causing material to flow in the axial direction is increased by means of the rotation of the rotors 4A and 4B when the torsional angle $\theta$ exceeds 50°, thereby resulting in uneven mixing of the material.

The ratios l/L and a/L of the length l of each of the center wings 11 and 14 of the rotor 4A and 4B and the length a of the portions without wings of the rotors in the axial direction to the length L in the direction of the axis of the rotors are set to more than 0.6 and not greater than 0.2, respectively. As a result of this, a mixing effect is ensured, and the drawing of material is smoothly carried out in a short time by bifurcating the flow of material at both ends of the center wings 11 and 14, whereby it becomes possible to eliminate uneven mixing of material within the chamber 3.

In the above embodiment, a constant quantity of material and compounding agent introduced through the material supply port 5 are forced in between the rotors 4A and 4B which rotate in opposite directions by means of the push-in ram 6, and they are drawn into the chamber 3. Upon completion of the forcing of all the material into the chamber 3, the even mixing of the entire material is started using the wings 11–15 of both rotors 4A and 4B.

A constant optimum shearing force acts on the material between an interior wall surface of the chamber 3 and the rotors 4A and 4B, and also between the rotors 4A and 4B. Then, the temperature of the material becomes appropriate, and the flow of material is carried out in an averaged manner in the axial direction as well as between the rotors 4A and 4B by virtue of the optimum length of the center wings 11 and 14 and the distance between the ends of the rotor and the center wing. As a result of this, the mixing of the material is speeded up and efficiently carried out without variations. Moreover, the time required for drawing the material into the chamber and mixing performance are improved, and therefore it is possible to reduce a mixing time and improve productivity.

FIGS. 3 through 6 show the results of a test which was conducted for the mixing of a tire compounding agent (NBR-based carbon master batch) using a first conventional example or a comparative example (which is a kneader of this embodiment having a torsional angle of 50°) and a kneader of this embodiment which has a ratio S/D of 0.014, a torsional angle of 40°, a ratio l/L of 0.7 and a ratio a/L of 0.15.

Figure 3:
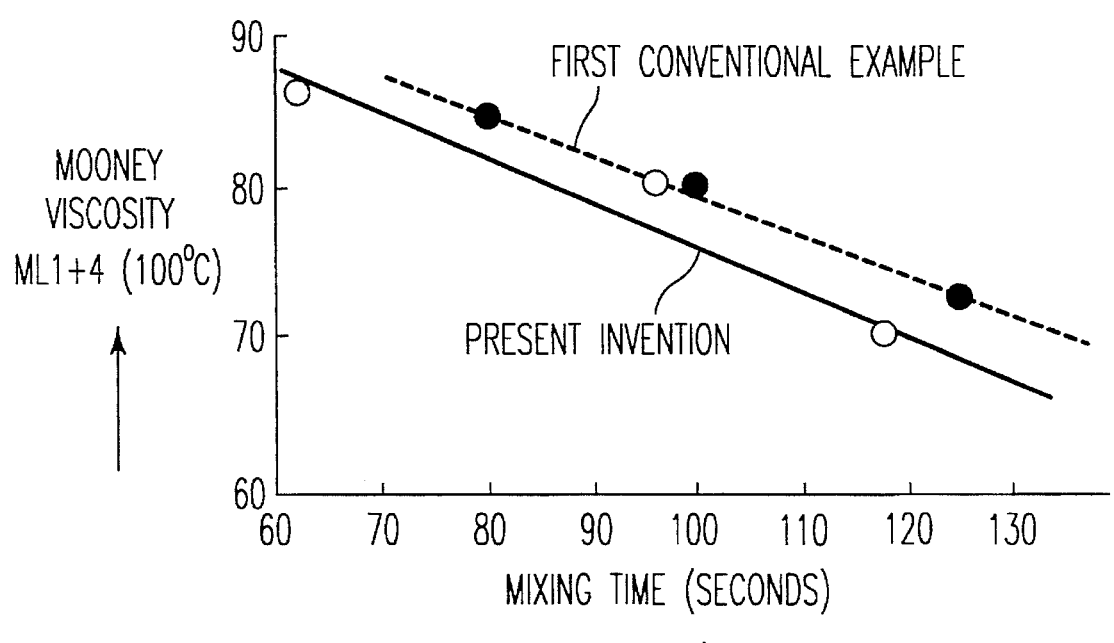
FIG. 3 is a graph showing the relationship between a material mixing time and Mooney viscosity obtained from the result of a material mixing test conducted using the kneader in the first embodiment and a first conventional example.
Figure 4:
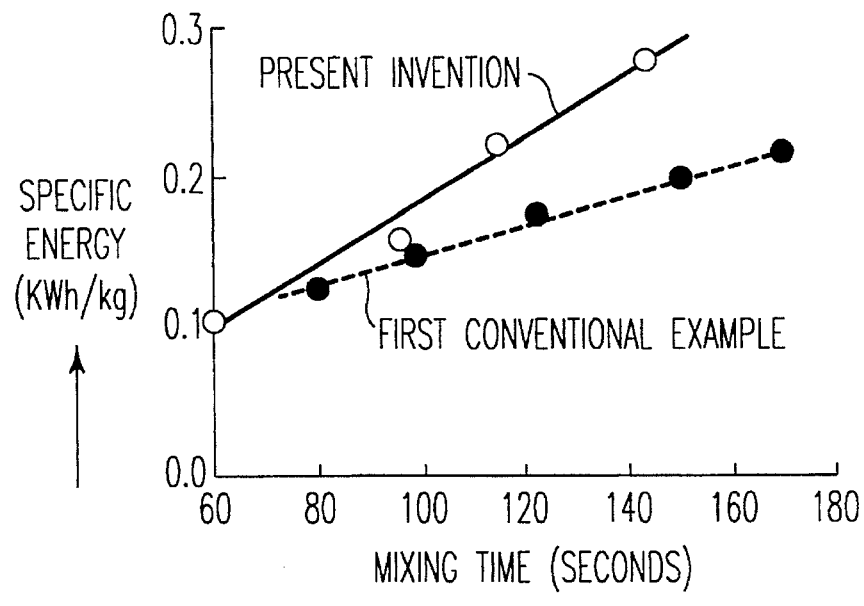
FIG. 4 is a graph showing the relationship between the material mixing time and specific energy obtained from the result of the material mixing test conducted using the kneader in the first embodiment and the first conventional example.

As is evident from FIG. 3, the degree of decrease of the Mooney viscosity relative to a mixing time obtained by the kneader of the present invention has a steeper inclination compared to that obtained by the first conventional example. It is also apparent that the kneader of this embodiment is superior to the first conventional example with respect to specific energy relative to a mixing time as shown in FIG. 4.

Figure 5:
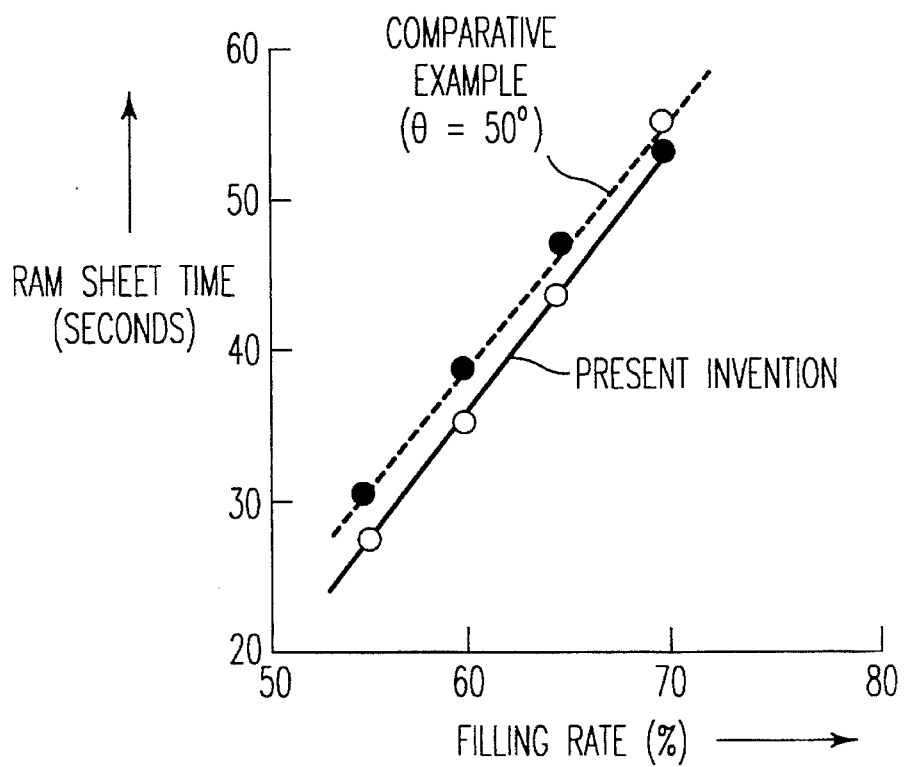
FIG. 5 is a graph showing the relationship between a material filling rate and a ram sheet time obtained from the result of the material mixing test using the kneader in the first embodiment and a comparative example.
Figure 6:
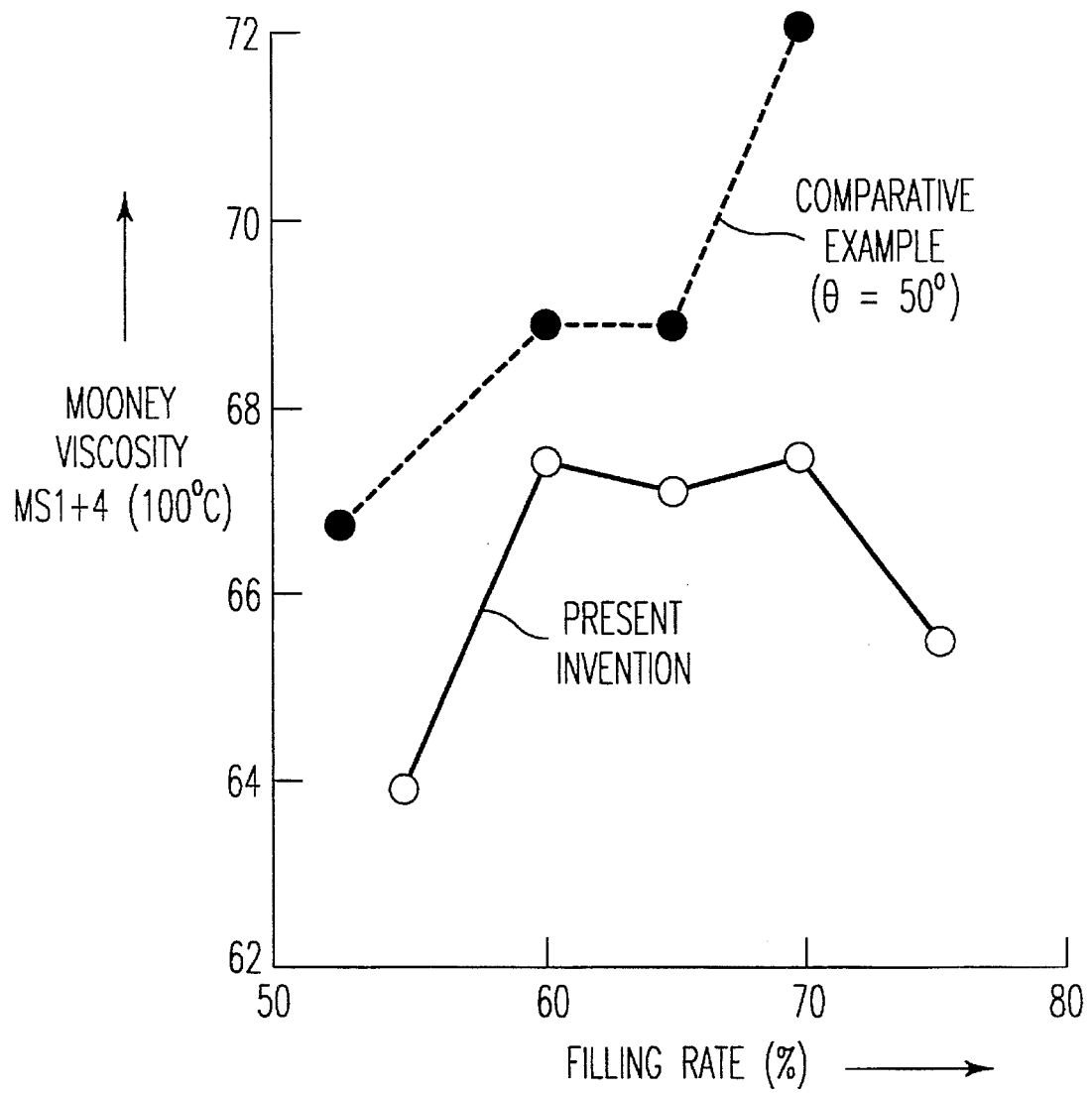
FIG. 6 is a graph showing the relationship between the material filling rate and the Mooney viscosity obtained from the result of the material mixing test using the kneader in the first embodiment and the comparative example.

Thus, it is possible for the kneader of this embodiment to obtain larger specific energy faster than the first conventional example, and therefore the kneader of this embodiment is more efficient. In addition, as shown in FIG. 5, concerning the time required for drawing material into the chamber 3 relative to a material filling rate, i.e., a ram sheet time (sec.), the kneader of this embodiment is faster than the comparative example. Regarding the Mooney viscosity relative to the filling rate, the kneader of this embodiment is lower than the comparative example as shown in FIG. 6. Accordingly, it is obvious that the kneader of this embodiment has a better mixing performance.

The present invention is not limited to the embodiment mentioned above. For example, the second end wing 13 may be removed from the rotor, or the second end wing 13 may be provided on both rotors. It is not necessary for the torsional angle θ of the end wings 12 and 15 to be made equal to that of the center wings 11 and 14, and the design of the torsional angle of the end wings may be changed appropriately.

Figure 7:
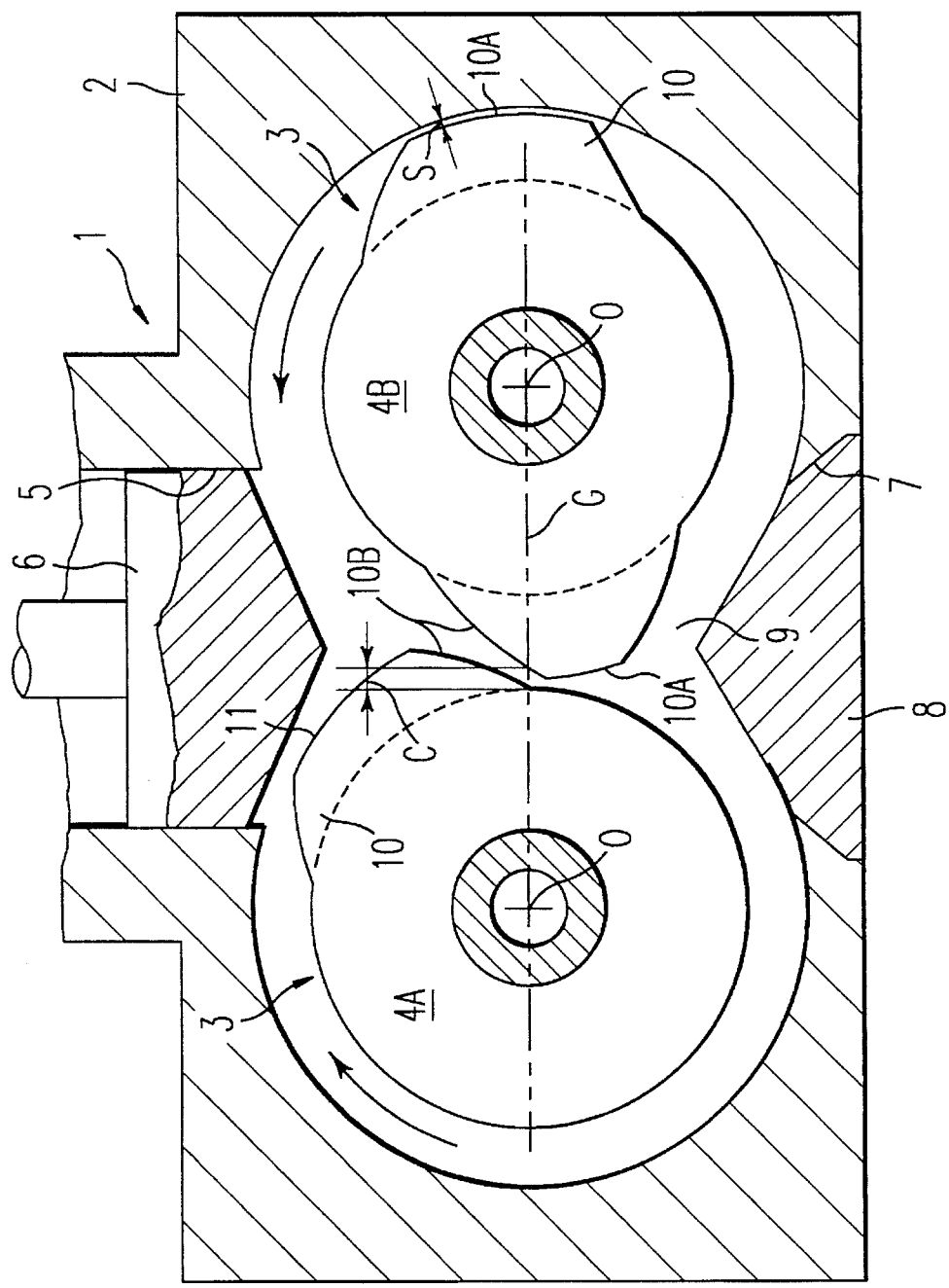
FIG. 7 is a longitudinal cross-sectional view showing the batch type kneader in a second embodiment according to the present invention.

FIG. 7 shows a batch type kneader in a second embodiment according to the present invention. The construction of this kneader is basically identical with that of the kneader shown in FIG. 1. The feature of this kneader resides in a clearance between the pair of rotors 4A and 4B. In other words, each of the wings 10 (also called "tip") projects at a predetermined torsional angle from the rotors 4A and 4B. These wings 10 mesh with each other when the rotors 4A and 4B are arranged parallel to each other within the chamber 3. The wings 10 are designed in such a way that a clearance C between opposite acting surfaces 10B of the wings 10, when the wings mesh with each other, becomes constant along a line G that interconnects the axial centers O of the rotors.

This clearance C becomes optimum in the range of 5–20 mm. If the value becomes smaller than the minimum value in this range, the clearance between the rotors 4A and 4B will become narrower, which will in turn make the biting of the material poor. Contrary to this, if the value becomes larger than the maximum value in the range, the clearance will become wider, and a shearing force occurring between the rotors will not act appropriately on the material.

In the second embodiment shown in FIG. 7, a constant quantity of material and compounding agent introduced from the material supply port 5 is forced in between the rotors 4A and 4B by means of the push-in ram 6. Upon completion of the forcing of all material into the chamber 3 using the ram 6, the even mixing of the entire material is started by means of the wings 10 of the rotors 4A and 4B. A constant optimum shearing force acts on the material in the tip clearance S between the chamber 3 and the rotors 4A and 4B, and also in between the acting surfaces 10B of the wings 10 which mesh with each other. In this way, the performance for mixing material by virtue of fractionization is improved.

The material, which stays at and below the material supply port 5 of the chamber 3 and is not yet drawn into the chamber 3, is sequentially drawn into the chamber. When the material thus drawn is appropriately broken into small pieces by means of the meshing portions (a space between the acting surfaces 10B) of the rotors 4A and 4B, the compounding agent other than the main body of the material (for example, rubber) more rapidly adheres to the surface of the fractionized main body of the material, which speeds up mixing. This substantially improves a capability of biting material, and reduces the time required for drawing the material.

The time during which all of the introduced material are simultaneously mixed in the chamber 3 becomes longer than the mixing time required for one mixing step (one batch), so that a mixing state every one batch (one step) becomes even, and therefore mixing performance is improved. When the mixing operation is finished, the door 8 is opened, and the push-in ram 6 is pulled out. Then, the material which has been mixed, i.e., a mixed substance, is taken out of the exhaust port 7.

Figure 8:
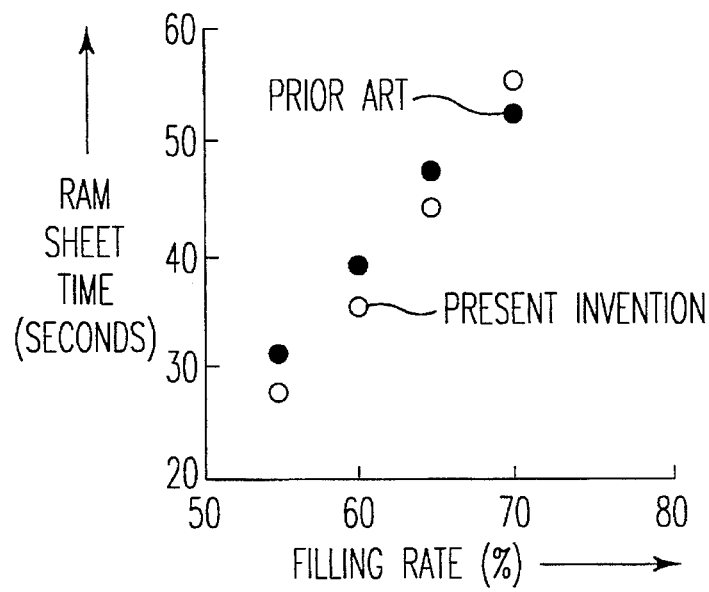
FIG. 8 is a graph showing a relationship between the material filling rate and the ram sheet time obtained from the result of a material mixing test using the kneader in the second embodiment shown in FIG. 7 and a conventional example.
Figure 9:
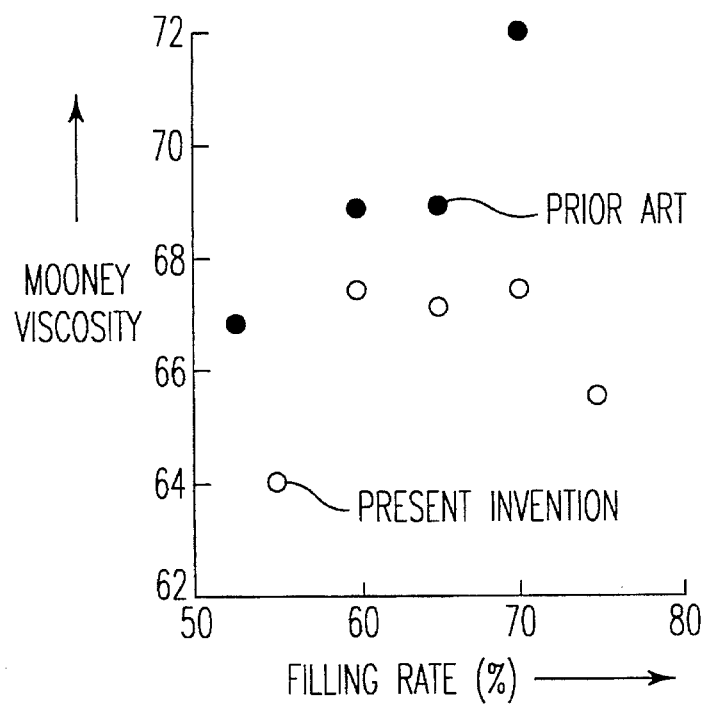
FIG. 9 is a graph showing the relationship between the material filling rate and the Mooney viscosity obtained from the result of the material mixing test using the kneader in the second embodiment and the conventional example.

FIGS. 8 and 9 show the results of a test which was conducted for mixing together rubber material (NBR) and carbon using the kneader 1 of the embodiment shown in FIG. 7 and the conventional kneader. As is evident from the relationship between a filling rate and a ram sheet time (the time required for drawing all of the material into the chamber), the ram sheet time obtained by the kneader of the second embodiment becomes shorter over the entire range of the filling rate. The Mooney viscosity HSl+4 (100° C.) relative to the filling rate becomes lower over the entire range of the filling rate in the case of the kneader of the second embodiment, compared with the conventional example, so that superior results were obtained.

Figure 10:
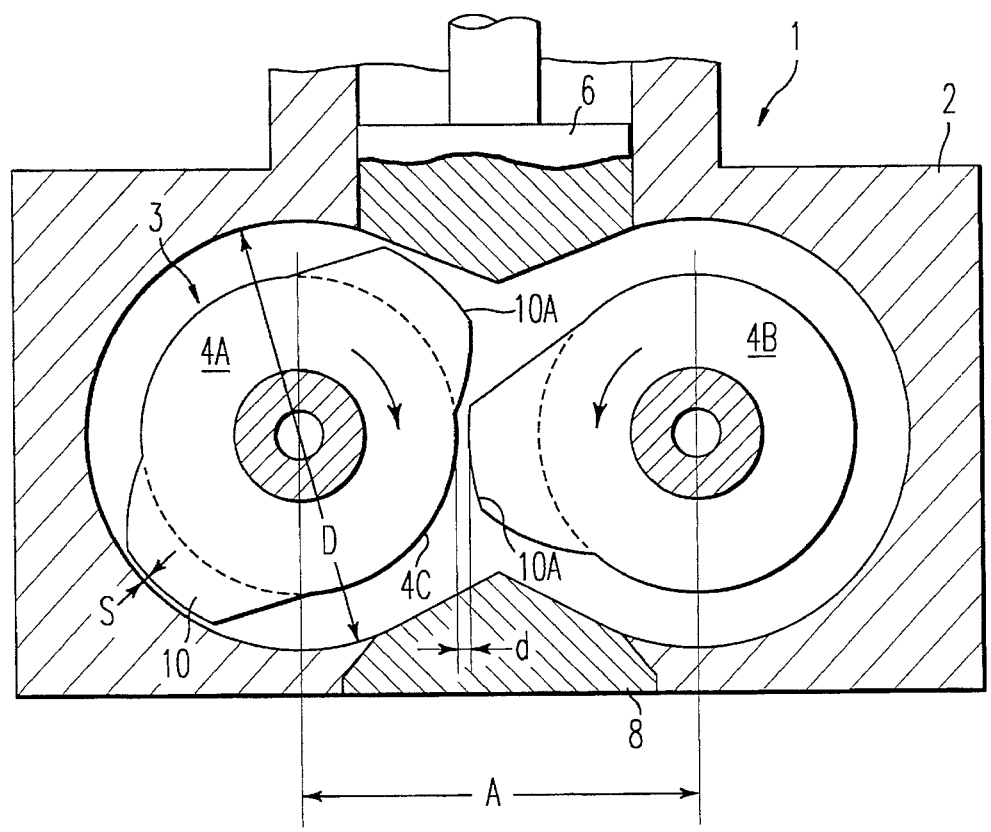
FIG. 10 is a longitudinal cross-sectional view showing the batch type kneader in a third embodiment according to the present invention.

FIG. 10 shows a third embodiment of the batch type kneader according to the present invention. The construction of the kneader of this embodiment is the same as that of the kneader shown in FIG. 7, except for the following points. Specifically, a distance d (along the line G interconnecting the center axes O of both rotors), between an outer circumferential end surface 10A of the wing 10 of each of the rotors 4A and 4B and a circumferential surface 4C of the barrel of the rotor, is constant, and a ratio d/A of the distance d to a distance A between the axes of the rotors 4A and 4B is set in the range of 0.01–0.04.

In the third embodiment, the ratio d/A is optionally selected and set in the range of 0.01–0.04 in response to a value of the physical property of a required mixed material. Moreover, the width of the outer circumferential surface 10A of the wing is set large because cooling efficiency is improved in the case of a meshing type kneader. For these reasons, it is possible to expect superior material mixing action by virtue of the optimum shearing force and resultant fractionization of the material occurring between the end surface 10A and the circumferential surface 4C of the barrel of the rotor.

Therefore, it is possible to optionally change, in an optimum manner, a ratio of the mixing action, occurring between the wings 10 and the interior wall surface of the chamber 3, to the mixing action occurring between the circumferential surface 4C of the barrel of the rotor and the outer circumferential outer surface 10A of the wing in accordance with the object of mixing. Thus, the material can be fractionized into small pieces by obtaining an optimum shearing force, and hence it is also possible to expect the improved property (capability) of biting the material.

When the ratio d/A is not greater than 0.01, the property of biting the material becomes poor, and the distance d between the opposite surfaces is reduced, which in turn increases the generation of heat. This makes it difficult to utilize the feature of the meshing type kneader that permits low-temperature mixing of material which is sensitive to an increase in temperature caused by an expected shearing force. For this reason, the ratio d/A is set in the range of 0.01–0.04. If the ratio d/A is more than 0.04, the distance d of the opposite surfaces, i.e., a space, will become larger. This might result in the generation of residual material, and also results in a reduced shearing force and insufficient mixing.

Figure 11:
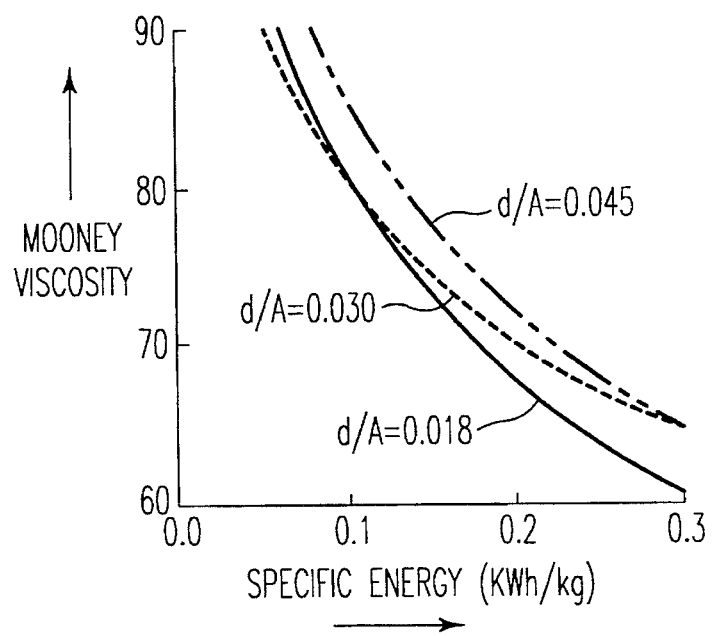
FIG. 11 is a graph showing the relationship between the specific energy and the Mooney viscosity obtained from the result of a material mixing test using the kneader in the third embodiment shown in FIG. 10.
Figure 12:
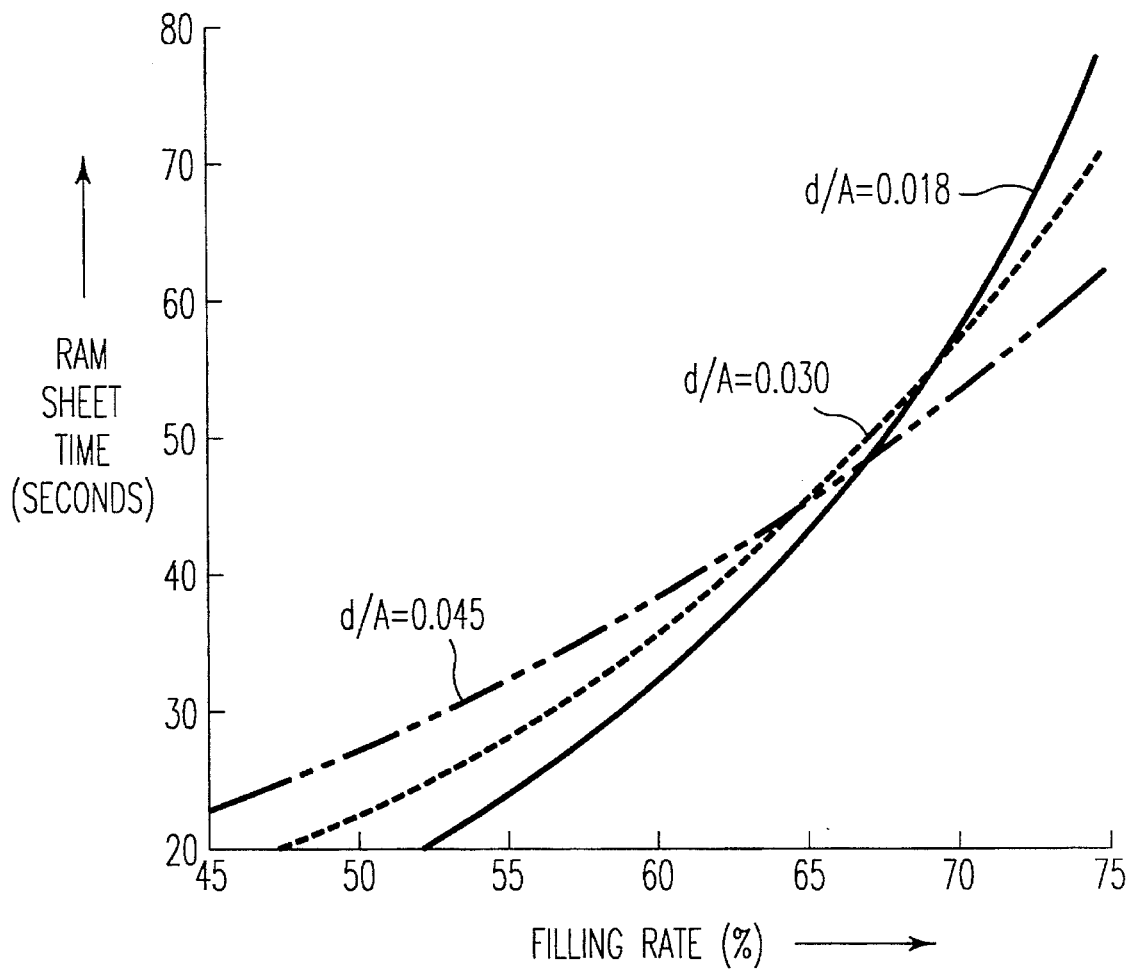
FIG. 12 is a graph showing the relationship between the material filling rate and the ram sheet time obtained from the result of the material mixing test using the kneader in the third embodiment shown in FIG. 10.

FIGS. 11 and 12 show the results of a test conducted for the mixing together of rubber material (NBR) and carbon using kneaders which respectively have ratios d/A of 0.018, 0.030 and 0.045.

FIG. 11 shows the relationship between specific energy and the Mooney viscosity MS1+4 (100° C.), and it is evident that a mixed substance having a low Mooney value is obtained. From the relationship between a filling rate and a ram sheet time shown in FIG. 12, it is obvious that the appropriate property of biting the material is obtained.

Figure 13:
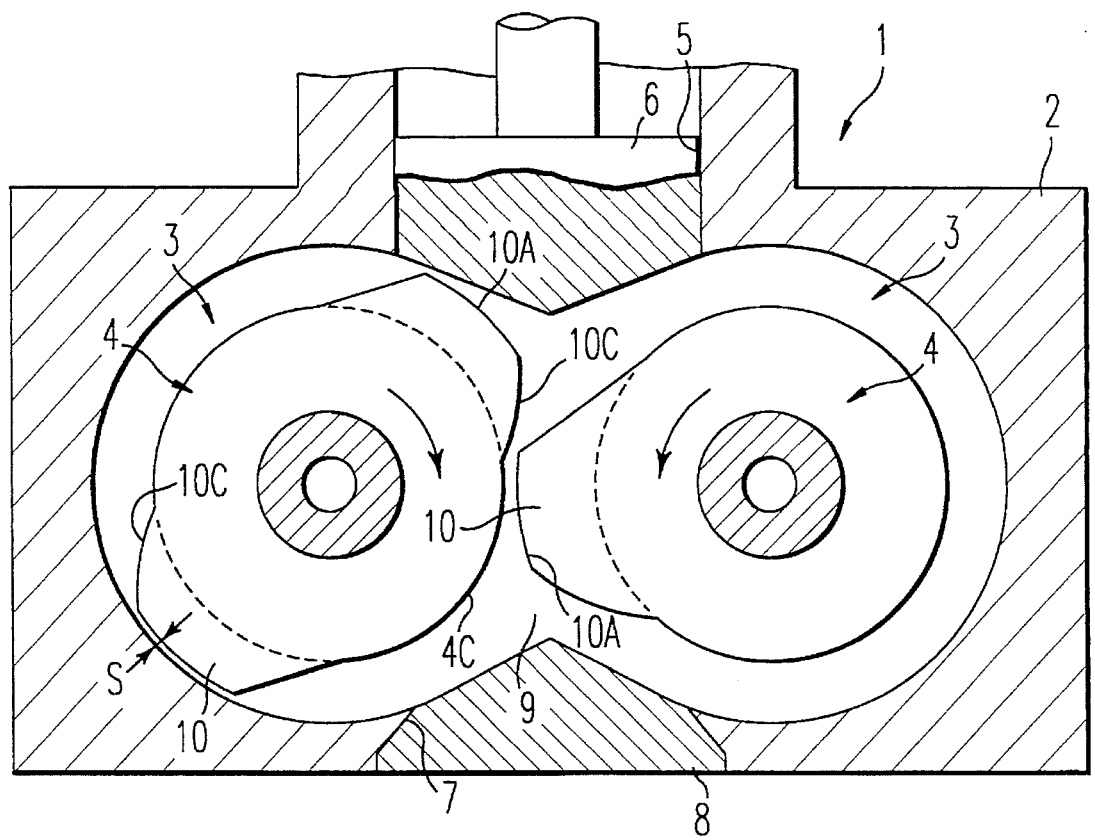
FIG. 13 is a longitudinal cross-sectional view showing the batch type kneader in a fourth embodiment according to the present invention.

FIG. 13 shows a batch type kneader in a fourth embodiment according to the present invention. The construction of the kneader of this embodiment is the same as that of the kneaders shown in FIGS. 1, 7 and 10, except for the shape of the wing 10.

Specifically, the wing 10 of each rotor 4 is provided with a material biting angled portion K where a rotor front surface 10C, which becomes a front surface in the direction of rotation, meets the land surface 10A.

The material biting angled portion K is formed into a two-stage chamfered shape consisting of a first corner 16 and a second corner 17 respectively defined by two lines which connect the front surface to the land surface. The lengths m of the corners 16 and 17 are substantially equal to each other. The front surface 10C, the first corner 16, the second corner 17 and the land surface 10A are continuous with each other in the form of a substantially smooth surface.

After the material has been plasticized by means of the chamfered portion, it becomes possible to pass the material with the maximum stability. For this reason, the lengths m of the first and second corners 16 and 17 of the material biting chamfered angled portion K are made equal to each other. In addition, it becomes possible to ensure a low-temperature mixing function and to improve mixing performance by setting the lengths m of the first and second corners 16 and 17 so as not to exceed 20% of a normal land width, in other words, by setting the land width so as not to be less than 20% of the normal land width.

The material biting angled portion K is formed in the shape of a two-stage structure, and therefore the amount of material passing through a space between the land surface 10A and the interior surface of the chamber 3 is increased. As a result of this, the smashing and fractionization of bale-shaped rubber material, or the like, which are caused by the shearing action in the early stage of mixing are effectively carried out. It is possible to increase the material biting capability and the mixing performance.

In the above embodiment, the angled biting portion K of the wing 10 of the rotor 4 is formed into a two-stage structure made up of two corners 16 and 17. This increases the amount of material passing through this angled portion K. Accordingly, the time required for drawing material is reduced, and the initiation of mixing of the entire material is speeded up, so that sufficient mixing is effectively carried out. The material is fractionized into small pieces even in between the wings 10 of the rotor and the circumferential surface of the body of the rotor by means of an optimum shearing force. The material actively passes through the space between the wings 10 and the interior wall surface of the chamber 3, and a ratio of the material which is mixed is increased. Thereby, the Mooney viscosity and the degree of dispersion of carbon are improved.

A larger amount of material passes through the angled biting portion K of the wing 10, and hence variations in temperature, viscosity and the degree of dispersion of carbon for each batch step become small. Thus, mixed material can be homogenized. Moreover, as a result of the improvement of the property of biting material and an increase in amount of material passing through the wings 10, the material is thrust from the inside of the chamber 3 to the supply port, and an upwardly pushing force of the push-in ram 6 is reduced. Hence, it only needs a small force to downwardly press the ram 6. This is advantageous in designing the strength of the rotors.

Figures 14A, 14B:
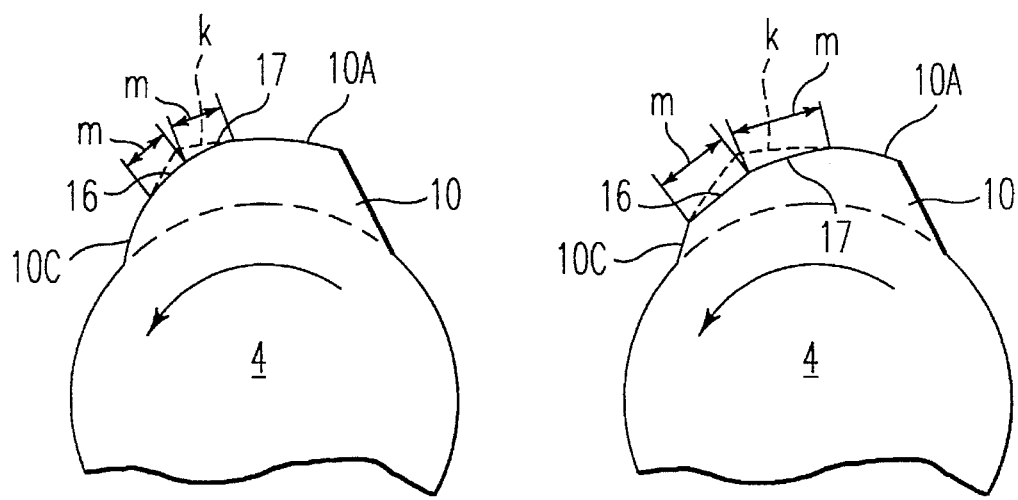

FIGS. 15 through 18 show the results of a test which was conducted using an NBR-based carbon master batch as a rubber material compounding agent. In the drawings, o designates the shape of a first rotor according to the present invention in which the lengths m of the corners shown in FIG. 14A are equal to each other; Δ, the shape of a second rotor according to the present invention in which the lengths m of the corners are different from each other; □, the shape of a third rotor according to the present invention in which the lengths m of the corners shown in FIG. 14B are equal to each other and, particularly, a land width remains to 30% of an ordinary land width; and x, an ordinary rotor (having one angled biting portion).

Figure 15:
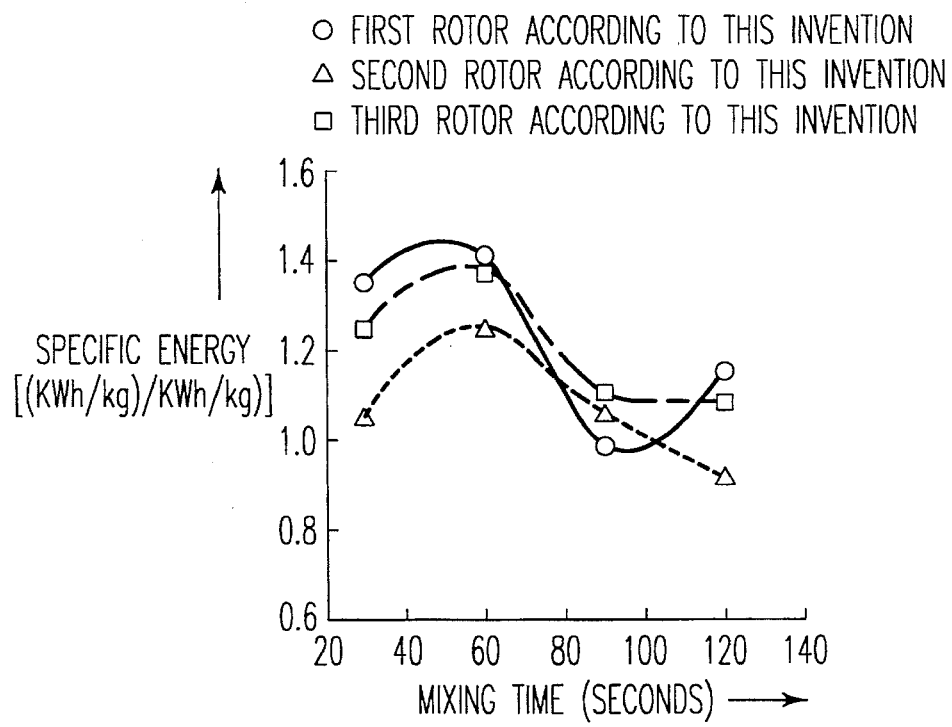
FIG. 15 is a graph showing the relationship between a material mixing time and the consumption of specific energy which is made dimensionless by means of a rotor having an ordinary shape, obtained from the result of a material mixing test using the kneader in the fourth embodiment shown in FIG. 13.

FIG. 15 shows variations in consumption of specific energy, which is made dimensionless by means of the shape of an ordinary rotor, relative to a material mixing time when a test was conducted using three types of rotors according to this invention, each having a different shape and size. The energy consumption of each rotor is in the range of 110–140% with respect to an ordinary rotor up to about sixty seconds in the early stage of mixing. In view of this fact, it is apparent that the amount of material which is drawn into the early stage of mixing is large.

Figure 16:
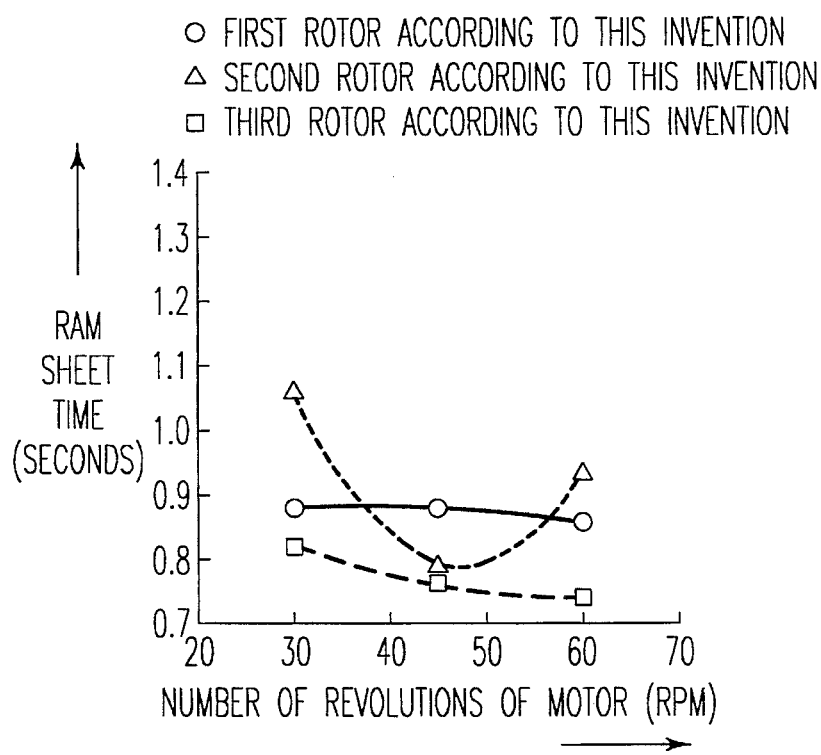
FIG. 16 is a graph showing the relationship between the number of revolutions of the rotor and a ram sheet time which is made dimensionless by means of a rotor having an ordinary shape, obtained from the result of a material mixing test using the kneader in the fourth embodiment.

FIG. 16 shows a ram sheet time, which is made dimensionless by means of the shape of an ordinary rotor, with respect to the number of revolutions of the rotors when a test was conducted using three types of rotors according to the present invention, each having a different size and shape. The ram sheet time that represents the property of biting material is significantly reduced, and each of the rotors has only 70–80% of the ram sheet time which is obtained using an ordinary rotor. In this way, the improvement of the capability of biting the material is evident. Particularly, in the case of the rotors designated by o and □ in the drawings, in which the lengths m of the corners are equal to each other, it can be seen that the ram sheet time is reduced in rotation of the rotor.

Figure 17:
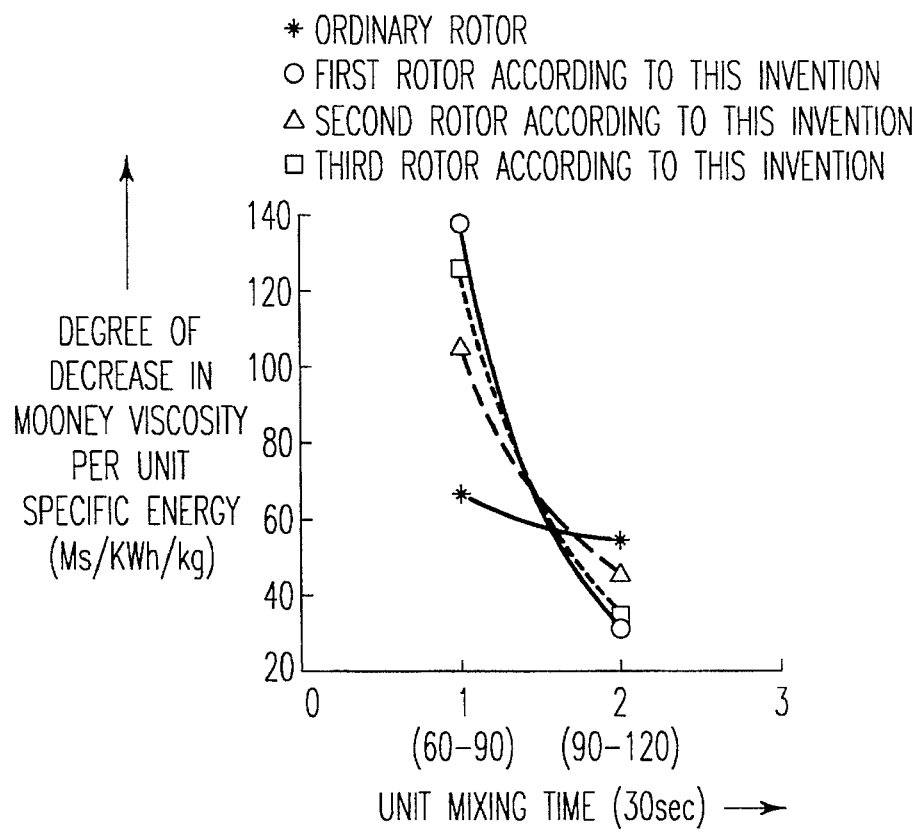
FIG. 17 is a graph showing the degree of drop of the Mooney viscosity per unit specific energy per unit mixing time (thirty seconds) obtained from the result of a material mixing test using the kneader in the fourth embodiment and the ordinary rotor.

FIG. 17 shows the degree of decreases in Mooney viscosity per unit specific energy per unit mixing time (thirty seconds) when a test was conducted using three types of rotors according to the present invention, each having a different shape and size, and an ordinary rotor. The degree of decreases in Mooney viscosity is larger in the initial sixty seconds of mixing compared with that obtained by the ordinary rotor. In the period between 90 to 120 seconds, a large degree of decreases in viscosity is still observed in the case of the ordinary rotor. On the other hand, in the case of the rotors according to the present invention, the degree of decreases in viscosity is about to be reduced and stabilized. Finally, a 5–6% drop of the Mooney viscosity was observed in the case of the rotors of the present invention compared with the ordinary rotor.

Figure 18:
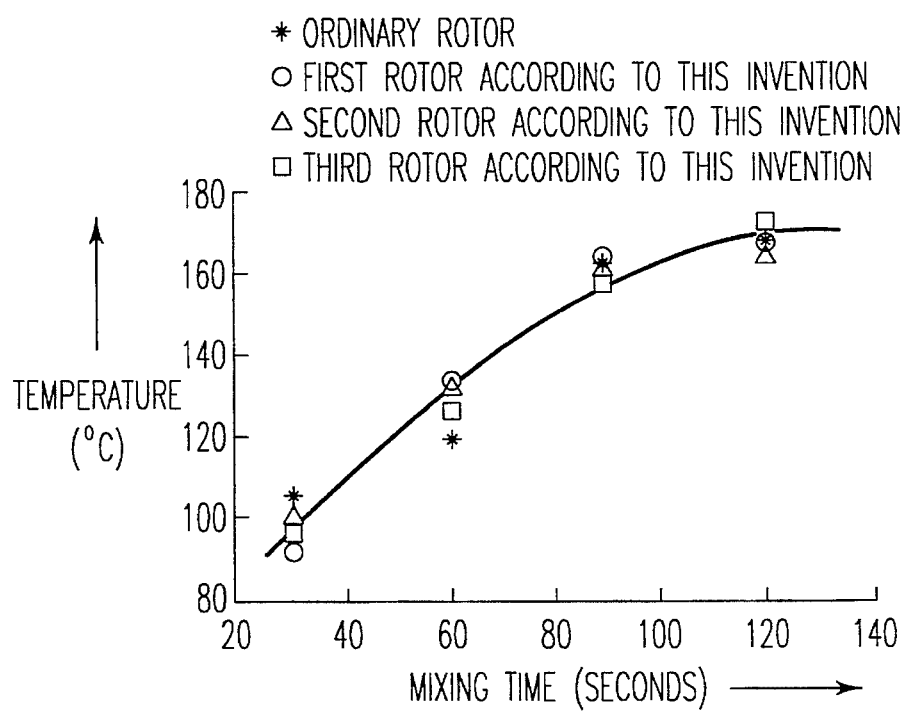
FIG. 18 is a graph showing the relationship between a material mixing time and variations in material discharge temperature obtained from the result of a material mixing test using the kneader in the fourth embodiment and the ordinary rotor.
Figure 19:
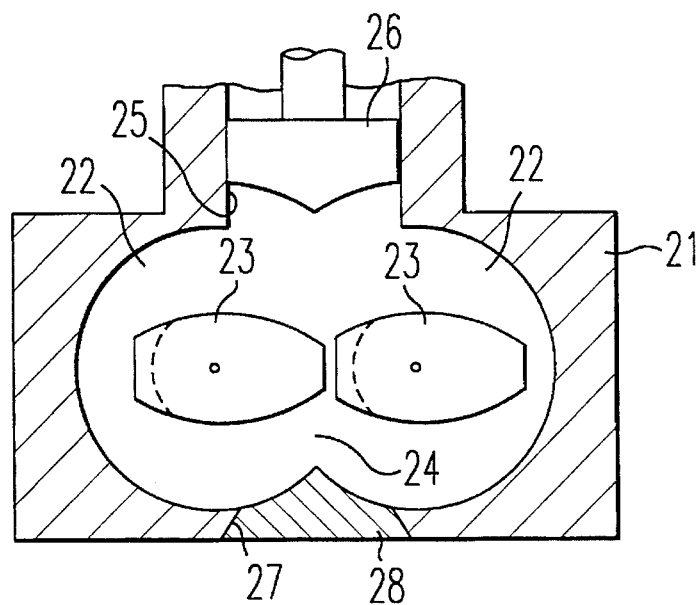
FIG. 19 is a longitudinal cross-sectional view showing a first conventional example.
Figure 20:
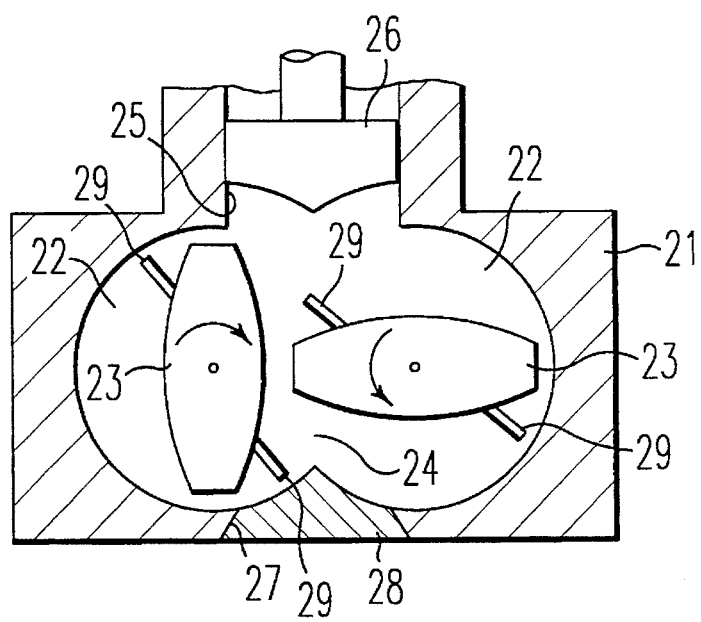
FIG. 20 is a longitudinal cross-sectional view showing a second conventional example.
Figure 21:
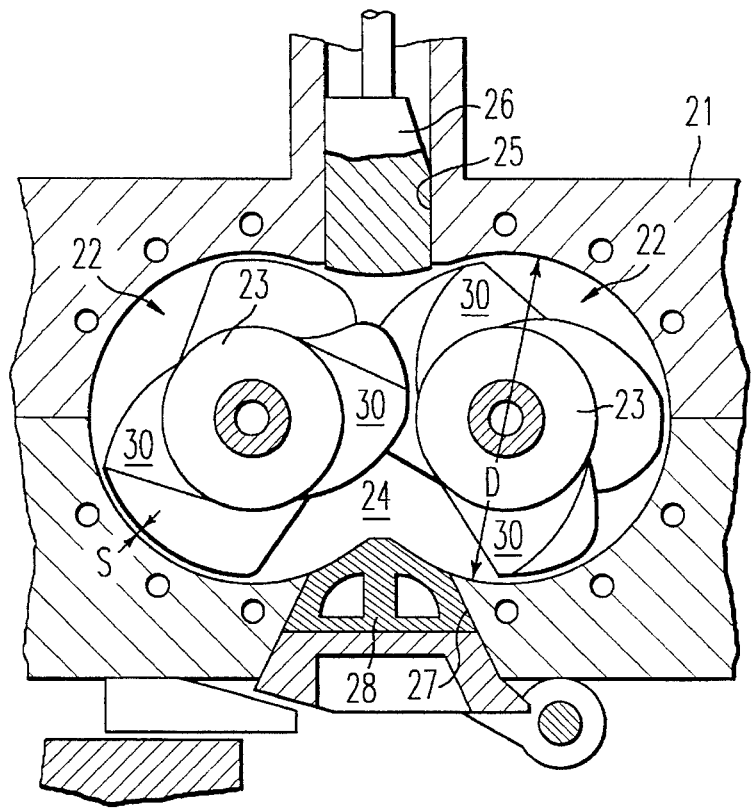
FIG. 21 is a longitudinal cross-sectional view showing a third conventional example.
Figure 22:
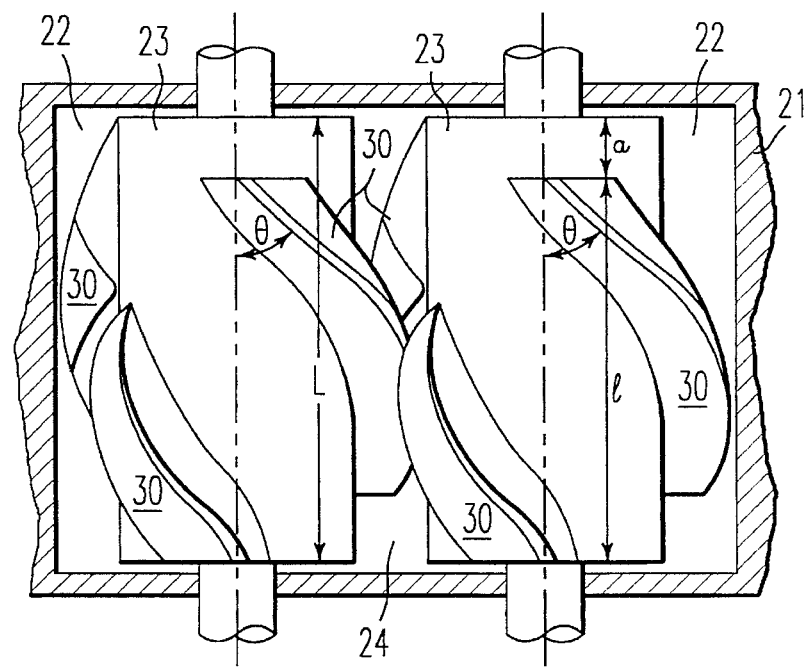
FIG. 22 is a plan view showing a rotor of the third conventional example.

It may be considered that there is a danger of the heat caused by shearing when the amount of material, which passes through the space between the wings 10 and the interior wall surface of the chamber 3, is significantly increased. However, as is evident from the relationship between variations in material exhaust temperature relative to a mixing time, as shown in FIG. 18, the length of a narrow area formed between the land surface 10A of the wing 10 of the rotor, which generates a large shearing force, and the interior wall surface of the chamber 3, that is the land width, is reduced by the same amount as the passing material is increased. Hence, there is no difference in material exhaust temperature, and the low-temperature mixing function is not impaired. Moreover, it can be seen from FIG. 18 that an increase in temperature of the rotors designated by o and Δ has already finished at 120 seconds. However, there is still some increase in temperature of the third rotor of the present invention designated by □. If the land width is reduced to not greater than 20% of the ordinary land width, the temperature is increased more. Therefore, it is desirable that the land width of the rotor of the present invention should not be set to not greater than 20%. Further, as is apparent from the results of the tests shown in FIGS. 15 through 18, the lengths m of the corners 16 and 17 of the angled biting portion K of the rotor 4 of the present invention are made substantially equal to each other. Thereby, the rotor of the present invention has superior performance when compared with the rotor of the present invention in which the lengths m of the corners are made different from each other.

The present invention is not limited to the embodiments mentioned above, and as a matter of course the design of the batch type kneader according to the present invention can be appropriately changed. Moreover, it is possible to combine the constructions of the embodiments shown in FIGS. 1, 7, 10 and 13 with each other.

INDUSTRIAL UTILIZATION

As can be seen from the above descriptions, the batch type kneader according to the present invention is preferably used in mixing polymeric materials, such as a rubber material.

What is claimed is:

1. A batch type kneader comprising:
   a chamber having a material supply port which can be sealed;
   a pair of rotors which are disposed in said chamber so as to be rotatable in opposite directions; and
   wings provided over the outer circumferential surfaces of said rotors in such a way that said wings mesh with each other, wherein said wings of said rotors are formed in such a way that opposite acting surfaces of said rotors when said wings mesh with each other are spaced by a constant clearance apart from each other along a line which interconnects the center axes of both rotors.

2. A batch type kneader comprising:
   a chamber having a material supply port which can be sealed;
   a pair of rotors which are disposed in said chamber so as to be rotatable in opposite directions; and
   wings provided over the outer circumferential surfaces of said rotors in such a way that said wings mesh with each other, wherein a ratio d/A of a distance d between the outer circumferential surface of said wings of one of said rotors and the outer circumferential surface of said wings of the other rotor, to a distance A between the axes of both rotors is set in the range of 0.01–0.04.

3. A batch type kneader comprising:
   a chamber having a material supply port which can be sealed;
   a pair of rotors which are disposed in said chamber so as to be rotatable in opposite directions; and
   wings provided over the outer circumferential surfaces of said rotors in such a way that said wings mesh with each other, wherein each of said wings of said rotors is provided with a front surface in the direction of rotation of said rotors, a land surface which meets said front surface and a chamfered angled portion for biting material, said chamfered angled portion being formed where said front surface and said land surface meet.

4. The batch type kneader according to claim 3, wherein the shape of a chamfered area of the chamfered angled portion is a two-stage structure defined by two lines which interconnect the front surface and the land surface.

5. The batch type kneader according to claim 4, wherein the lengths of the front surface and the land surface are made substantially equal to each other.

6. A batch type kneader comprising:
   a chamber having a material supply port which can be sealed;
   a pair or rotors which are disposed in said chamber so as to be rotatable in opposite directions; and
   wings provided over the outer circumferential surfaces of said rotors in such a way that said wings mesh with each other,
   wherein a ratio S/D of a clearance S between the outer circumferential surface of each of said wings of said rotors and an interior wall surface of said chamber to an inner diameter D of said chamber is set in the range of 0.01–0.02, wherein said wings of said rotors are provided with center wings positioned at the center of said rotors in the direction of axes of said rotors, and a ratio l/L of a length l in the direction of axes of the center wings to a length L in the direction of the axes of said rotors in said chamber is set to more than 0.6, and a ratio a/L of a length a in the direction of the axes of said rotors between the ends of the center wings and the ends of said rotors to the length L in the direction of the axes of said rotors in said chamber is set to not greater than 0.2.

7. A batch type kneader comprising:
   a chamber having a material supply port which can be sealed;
   a pair or rotors which are disposed in said chamber so as to be rotatable in opposite directions; and
   wings provided over the outer circumferential surfaces of said rotors in such a way that said wings mesh with each other,
   wherein a ratio S/D of a clearance S between the outer circumferential surface of each of said wings of said rotors and an interior wall surface of said chamber to an inner diameter D of said chamber is set in the range of 0.01–0.02, wherein said wings of said rotors are provided with a center wing positioned at the center of said rotors in the direction of axes of said rotors and end wings positioned at both ends of said rotor in the direction of the axes of said rotors, and the end wing position at one end of said rotor has the same torsional angle as that of the center wing, and the end wing position at the other end of said rotors has a torsional angle which is opposite to that of the center wing.

8. A batch type kneader comprising:
   a chamber having a material supply port which can be sealed;
   a pair or rotors which are disposed in said chamber so as to be rotatable in opposite directions; and wings provided over the outer circumferential surfaces of said rotors in such a way that said wings mesh with each other, wherein a ratio S/D of a clearance S between the outer circumferential surface of each of said wings of said rotors and an interior wall surface of said chamber to an inner diameter D of said chamber is set in the range of 0.01–0.02, wherein said wings of said rotors are provided with one center wing positioned at the center of said rotor in the direction of the axes of said rotors, one end wing positioned at one end of said rotors in the direction of the axes of said rotors, and two end wings positioned at the other end of said rotors.

9. The batch type kneader according to claims 6 or 7 or 8, wherein a torsional angle θ with respect to the axes of said wings of said rotors is set to less than 50°.

* * * * *